United States Patent [19]
Hamai et al.

[11] Patent Number: 5,825,567
[45] Date of Patent: Oct. 20, 1998

[54] APPARATUS FOR RECORDING DIGITAL SIGNALS BY CONTROLLING FREQUENCY CHARACTERISTICS OF DIGITAL SIGNALS UTILIZING BIT EXTRACTION AND INTERLEAVED NRZI MOLULATION

[75] Inventors: Shinji Hamai, Osaka; Masao Okabe, Hannan; Yasunori Kawakami, Osaka, all of Japan

[73] Assignee: Matsushita Electric Industrial Co., Ltd., Osaka, Japan

[21] Appl. No.: 674,870

[22] Filed: Jul. 2, 1996

Related U.S. Application Data

[62] Division of Ser. No. 453,777, May 30, 1995, Pat. No. 5,579,182, which is a continuation of Ser. No. 124,637, Sep. 22, 1993, abandoned.

[30] Foreign Application Priority Data

| Oct. 16, 1992 | [JP] | Japan | 4-278954 |
| Dec. 1, 1992 | [JP] | Japan | 4-321608 |
| Dec. 1, 1992 | [JP] | Japan | 4-321610 |
| Dec. 1, 1992 | [JP] | Japan | 4-321611 |

[51] Int. Cl.$^6$ ............................................. G11B 5/09
[52] U.S. Cl. .................................. 360/41; 360/40
[58] Field of Search ........................ 360/40, 41, 39, 360/48; 369/59; 341/58, 73; 365/230.02; 375/242; 386/104; 178/17 B

[56] References Cited

U.S. PATENT DOCUMENTS

| 3,644,670 | 2/1972 | Dessy | 178/17 B |
| 4,367,495 | 1/1983 | Mita et al. | 360/39 |
| 4,501,000 | 2/1985 | Immink et al. | 375/242 |
| 4,577,180 | 3/1986 | Fukuda | 341/73 |
| 4,598,267 | 7/1986 | Fukuda | 341/58 |
| 4,758,907 | 7/1988 | Okamoto et al. | 360/48 |
| 4,930,108 | 5/1990 | Sugiyama | 365/230.12 |
| 5,140,474 | 8/1992 | Kahlman et al. | 360/40 |
| 5,142,421 | 8/1992 | Kahlman et al. | 360/40 |
| 5,311,493 | 5/1994 | Fuji | 367/59 |
| 5,337,193 | 8/1994 | Murabayashi et al. | 386/104 |
| 5,432,651 | 7/1995 | Magno et al. | 360/41 |

FOREIGN PATENT DOCUMENTS

| EP0250049 | 12/1987 | European Pat. Off. . |
| EP0339724 | 11/1989 | European Pat. Off. . |
| EP0476766 | 3/1992 | European Pat. Off. . |
| EP0476767 | 3/1992 | European Pat. Off. . |
| 4255969 | 9/1992 | Japan . |

OTHER PUBLICATIONS

Patent Abstracts of Japan, vol. 17, No. 058 (P–1481), 4 Feb. 1993.
Patent Abstracts of Japan, vol. 15, No. 308 (E–1097), 7 Aug. 1991.
Patent Abstracts of Japan, vol. 16, No. 404 (P–1410), 26 Aug. 1991.
Patent Abstracts of Japan, vol. 10, No. 259 (E–434), 4 Sep. 1986.

*Primary Examiner*—Thang V. Tran
*Assistant Examiner*—Patrick Wamsley
*Attorney, Agent, or Firm*—Wenderoth, Lind & Ponack

[57] ABSTRACT

When modulating by an interleaved NRZI technique by inserting one bit per every m bits of input data series, the frequency characteristics of bit rows varying by the polarity ("0" or "1") of the bit to be inserted are compared, and the bit row closer to the desired frequency characteristic is selected as the output series, so that recording is effected by controlling the frequency characteristics of the digital signal.

4 Claims, 16 Drawing Sheets

PRE-CODER

OUTPUT SELECTING CIRCUIT 20

BIT EXTRACTING CIRCUIT 2

BIT DIVIDING CIRCUIT 24

APPARATUS FOR RECORDING DIGITAL SIGNALS BY CONTROLLING FREQUENCY CHARACTERISTICS OF DIGITAL SIGNALS UTILIZING BIT EXTRACTION AND INTERLEAVED NRZI MOLULATION

This is a Divisional application of now pending application Ser. No. 08/453,777, filed May 30, 1995 now U.S. Pat. No. 5,579,182, which in turn is a Continuation of now abandoned application Ser. No. 08/124,637, filed Sep. 22, 1993, now abandoned.

BACKGROUND OF THE INVENTION

1. Field of the Invention

The present invention relates to a recording apparatus for recording digital signals, such as a digital video cassette recorder (VCR).

2. Description of the Prior Art

In a magnetic recording apparatus, such as a VCR, when reproducing, as the head goes off the track, the head output is lowered, and the error increases, so that an accurate picture cannot be reproduced. It is therefore important that the head traces the intended track accurately, that is, to keep the head tracking. In the digital VCR for home use, in particular, the tracks are narrow in order to record long programs, and it is necessary to keep the head tracking more accurately.

As the means for detecting the deviation of the head from the track, using pilot signals between tracks, the crosstalk of the pilot signals from the preceding and succeeding tracks are compared, and a determination is made as to whether the head tracking has deviated to the preceding side or to the succeeding side.

The recording signals for this purpose are modulated when recording so as to have the frequency characteristics of three patterns 0F, F1, F2 as shown in FIG. 22. In the 0F pattern, frequencies $f_1$ and $f_2$ possess portions of small frequency components, that is, notch portions. In the F1 pattern, frequency $f_1$ possesses a portion having a larger frequency component, that is, a pilot signal, while frequency $f_2$ possesses a notch portion. In the F2 pattern, frequency $f_1$, possesses a notch portion, and frequency $f_2$ has a pilot signal.

The recording signals are modulated so that the patterns may be in the order of 0F, F1, 0F, F2 as shown in FIG. 23, and recorded. When reproducing the 0F pattern, by the crosstalk of pilot signals from the F1 and F2 patterns of adjacent tracks, there is a peak in frequency components of $f_1$, and $f_2$. When the head is deviated from the center of the 0F pattern and is shifted to the F1 pattern side, the crosstalk of the pilot signal from the F1 pattern becomes larger than the crosstalk from the F2 pattern, and therefore the frequency components of $f_1$ of the reproduced signal increase, while the frequency components of $f_2$ decrease. Thus, by comparing the frequency components of $f_1$ and $f_2$ of the reproduced signals of the 0F pattern, the deviation of head tracking can be detected, and a correct tracking is realized.

Hitherto, the patterns of F0, F1, F2 are formed by controlling the linkage "0" and "1" in the binary series to be recorded. This method is explained below. First, the input data is divided by every m bits (m: an even number), and a "0" bit is added to the beginning of the m bits to enter a pre-coder to be modulated by an interleaved NRZI (Non Return to Zero Invert) technique. Similarly, a "1" bit is added to the beginning of m bits of the input data to enter the pre-coder to be modulated by the interleaved NRZI technique. The characteristic of the pre-coder is expressed by formula (1) below, and it is utilized for known partial response detection when decoding, and moreover when the polarity of the bit to be inserted is inverted, the inversion of polarity is propagated as shown in formula (1), and it causes an increase to the change of frequency characteristics by the change of polarity of the bit to be inserted. The bit of "0" or "1" to be inserted is hereinafter called a special bit (SB).

$$f_k = g_k + f_{k-2} \quad (+ \text{is exclusive OR}) \quad \text{- - - (i)}$$

where $\{gk\}$ is a pre-coder input data series, and $\{fk\}$ is a pre-coder output data series. Extracting the frequency components of the pre-coder output, the frequency components are compared between the pre-coder output when the SB is "0", and the pre-coder output when the SB is "1", and the pre-coder output closer to the desired frequency characteristic is used as the output of the recording apparatus, so that the output data series having the desired frequency characteristic is obtained.

FIG. 2 shows examples of an input data series by the interleaved NRZI technique at m=10, SB A, and output data series. As the polarity of SB A is inverted, the polarity of the second bit ahead of SB A is inverted according to formula (1). As the polarity of the second bit ahead of SB A is inverted, the polarity of the second bit ahead of the second bit ahead of SB A is inverted. In this way, as the polarity of SB A is inverted, the polarity of every odd-number bit counting from SB A is inverted. This inversion continues until the odd-number bit from SB A is a new SB, that is, SB C. In other words, by inverting the polarity of a certain SB, the polarity of the odd-number bit counting from that SB is inverted m times. The bit of (m+l) counting is a new SB C, and this inversion is not propagated. The bits inverted as SB A is inverted are m+l bits indicated by bullet mark.

By the interleaved NRZI and the propagation of change of SB polarity, changes of frequency characteristics by an SB polarity change are increased.

Conventionally, the frequency components were compared between the bit row of m+l bits by interleaved NRZI modulation with "0" added as an SB to m bits, and the bit row of m+l bits by interleaved NRZI modulation with "1" added as an SB to m bits, and by recording m+l closer to the frequency component of the desired frequency, the desired frequency component of the recorded signal was controlled. As the means for extracting frequency components, a Fourier transform is used.

SUMMARY OF THE INVENTION

It is hence a primary object of the invention to realize a circuit for controlling the frequency characteristics of digital signals by varying the polarity of the SB to be inserted due to the change of frequency characteristics of the bit varying in polarity by changing the bit to be inserted when modulating by the interleaved NRZI technique by inserting one bit in every m bits, by a simple circuit (small-scale circuit).

To achieve the above object, the invention presents a recording apparatus comprising: a bit extracting means for extracting inverted m+l bits of a first series of bits obtained by interleaved the NRZI modulation technique of an input data series added to one "0" bit per every m bits (m is an even number equal or greater than 2) and a second series of bits obtained by the interleaved NRZI modulation technique of the input data series added to one "1" bit per every m bits; a frequency component extracting means for extracting at least two specified frequency components of the bit extracting means; an output selection means for producing an output bit series depending on the size of the frequency component, and a recording means for recording the output bit series on a magnetic tape.

BRIEF DESCRIPTION OF THE DRAWINGS

FIG. 18 is a block diagram of a representative value generating circuit 38a.

DESCRIPTION OF THE EMBODIMENTS

Figure 2:
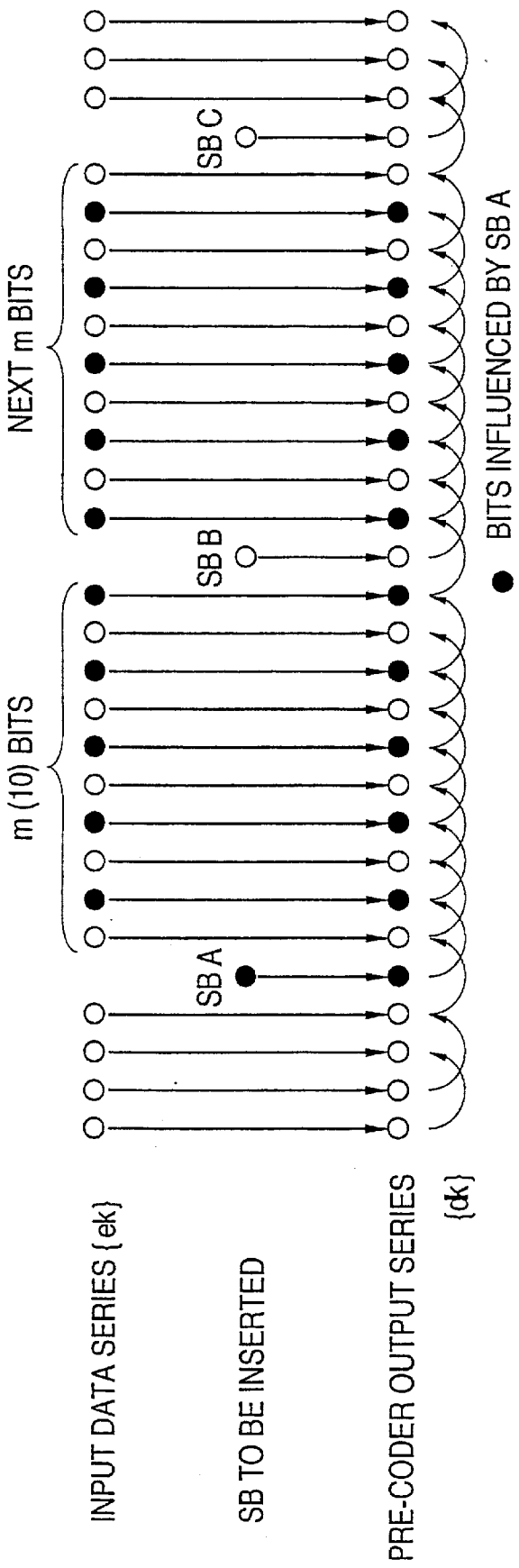
FIG. 2 is an explanatory diagram of interleaved NRZI modulation technique.

FIG. 2 shows the relationship between the input data series and pre-coder output series in the interleaved NRZI modulation technique. In every m bits of the input data series, an SB is inserted by one bit. By the pre-coder, the input data series is pre-coded according to formula (1). Therefore, when the polarity of the SB is inverted, the odd-number bit counting from the SB is inverted. When the polarity of SB A is inverted, the odd-number bit from SB A is inverted, but the bits after SB C are determined by SB C, and the polarity of the bit after SB A by the SB A influences only m+1 bits indicated by the bullet marked bit in the pre-coder output series in FIG. 2. The circle mark bits do not depend on the polarity of SB A.

Hitherto, in the unit of m+1 bits starting from SB, the frequency component was extracted and the SB was determined. According to this method, when the polarity of the SB A is inverted, among m+1 bits to be noticed, the polarity is inverted in m/2+1 bits indicated by the bullet mark, but the polarity is not inverted in m/2 bits indicated by circle marks. That is, m/2 bits which are fixed bits not inverted by the polarity of SB A. By the presence of these fixed bits, the change of the frequency component by inversion of the SB is blocked, which results in interference for obtaining a bit row possessing a desired frequency characteristic. In the m/2 bits in the next word, there are bits inverted in polarity by inversion of the polarity of SB A, but this interval is not taken into consideration for the calculation of the frequency components. Therefore, by performing the calculation of the frequency components only in the SB and the bits influenced by this SB, the change of the frequency characteristic by the polarity change of the SB can be increased, so that the notch or pilot signal of excellent characteristics may be generated.

This is to extract the bits influenced by the SB which are extracted in the pre-coded series, but it is also possible to extract the bits to be influenced by the SB preliminarily from the series to be pre-coded or the input data series, and pre-code the selected bit row.

By calculating the frequency components of the bullet marked bits only in FIG. 2, the number of bits to calculate the frequency components is m+1 bits, which is same as in the prior art, and the circuit scale for frequency component calculation is unchanged. Besides, by inversion of the SB, all of the bits used in the frequency component extraction are inverted, and therefore the pre-coded data when SB is "0" can be determined by inverting the pre-coded data when the SB is "1", and it is not necessary to determine the pre-coded data both when the SB is "0" and when the SB is "1", so that the circuit scale may be further curtailed.

Figure 1:
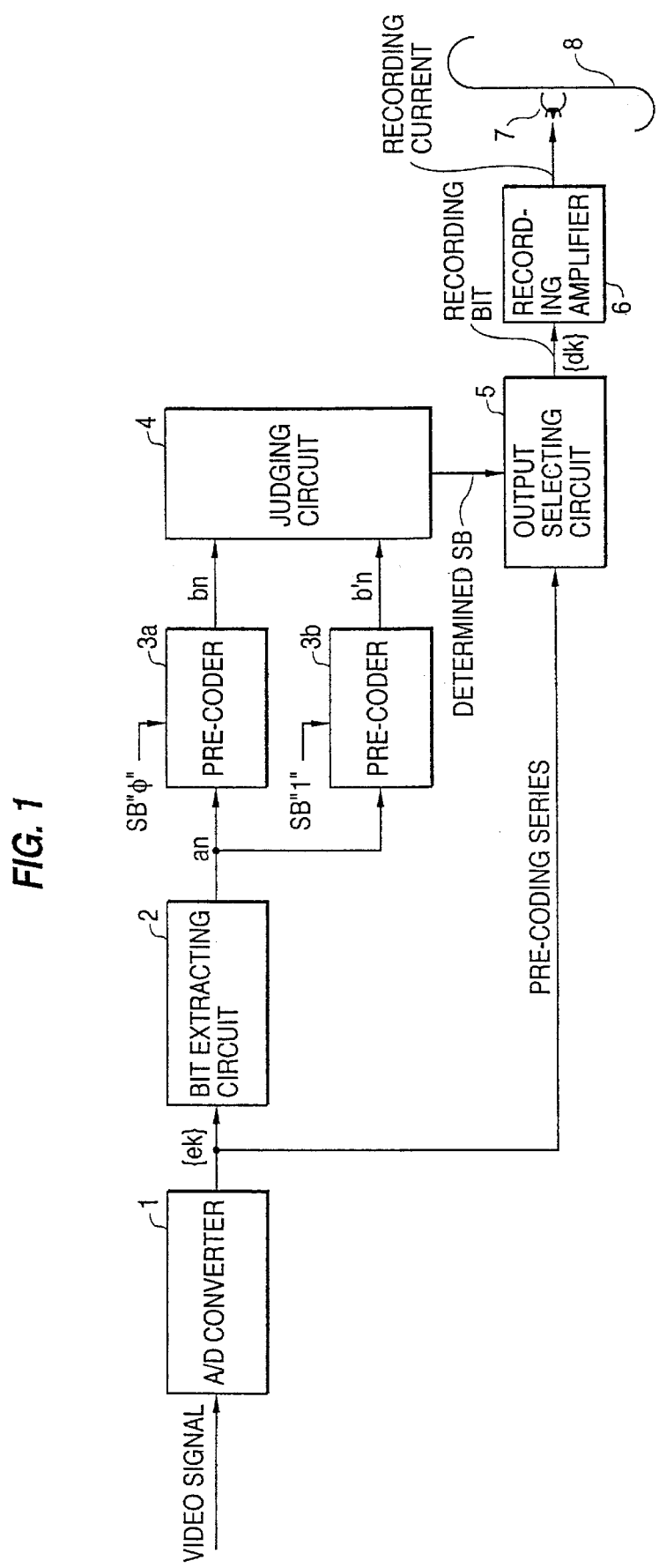
FIG. 1 is a block diagram of an embodiment of the present invention.

One of the embodiments of the invention is described below with reference to accompanying drawings. FIG. 1 is a block diagram of an embodiment of the present invention. In FIG. 1, numeral 1 is an A/D converter; element 2 is a bit extracting circuit; elements 3a and 3b are pre-coders; element 4 is a judging circuit; element 5 is an output selecting circuit; element 6 is a recording amplifier; element 7 is a recording head, and element 8 is a magnetic tape. An input video signal is sampled and quantized in the A/D converter 1, and is converted into a digital bit series $\{e_k\}$. This bit row is divided in every m bits, and an SB is inserted between them, and the interleaved NRZI modulation technique is effected, and the bit series to be recorded $\{d_k\}$ is obtained, and by noticing a certain SB, in the bit extracting circuit 2, in order to determine this SB, m/2 even-number bits among next m bits from the place of insertion of the SB of notice in the output bit series of the A/D converter 1, and m/2 odd-number bits out of the next m bits are output to the pre-coders 3a and 3b. The bit row of m bits produced from the bit extracting circuit 1 comprises the bits influenced by the polarity of the SB when modulated by the interleaved NRZI technique. These bit rows (an (n=0, 1, . . . , m−1)) are prefixed by the SB by the pre-coders 3a and 3b, modulated by the interleaved NRZI technique, and output to the judging circuit 4 as bit rows of m+1 bits. Herein, the pre-coder 3a adds "0" as the SB, and produces bit rows $b_n$ (n=0, 1, . . . , m), while the pre-coder 3b adds "1" as SB, and produces bits $b_{n'}$ (n=0, 1, . . . , m). In the judging circuit 4, comparing the frequency characteristics of $b_n$ and $b_{n'}$, the bit row closer to the desired frequency characteristic is determined, and the judged SB is output to the output selecting circuit 5. In the output selection circuit 5, the SB output by the judging circuit 4 is inserted in every m bits of output series $\{e_k\}$ of the A/D converter 1, and the interleaved NRZI modulation technique is performed, and the record bit row $\{d_k\}$ is output to the recording amplifier 6. In the recording amplifier 6, the record bit row $\{d_k\}$ is converted into the recording current, and is output to the recording head 7. Using the recording head 7, the record bit row is recorded on the magnetic tape 8.

Figure 3:
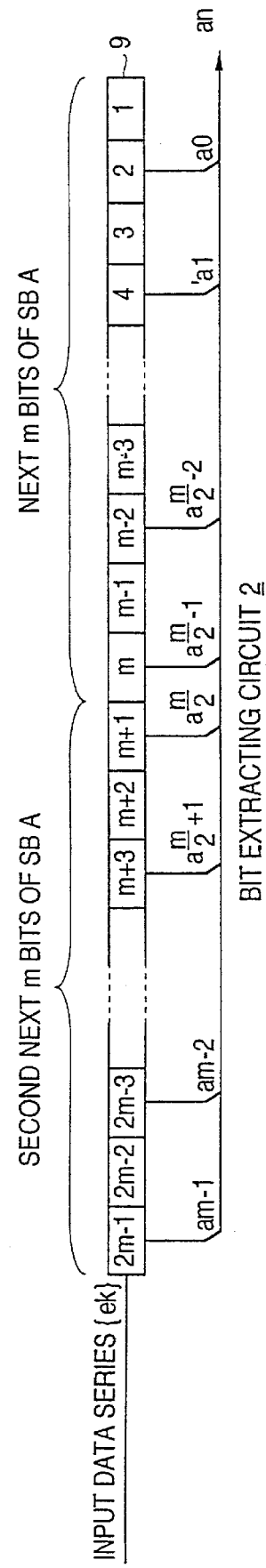
FIG. 3 is a block diagram of a bit extracting circuit 2.

A block diagram of the bit extracting circuit 2 is shown in FIG. 3. The bits changed in polarity by the SB polarity are bullet marked bits in the input data series shown in FIG. 2. Accordingly, the input data series $\{e_k\}$ is fed into a shift register 9, and when the next bit from the place for inserting the SB at the beginning comes, the even number bits of next m bits from the SB inserting place, and the odd number bits of second bit therefrom are produced. These bits are $a_n$.

Figure 4:
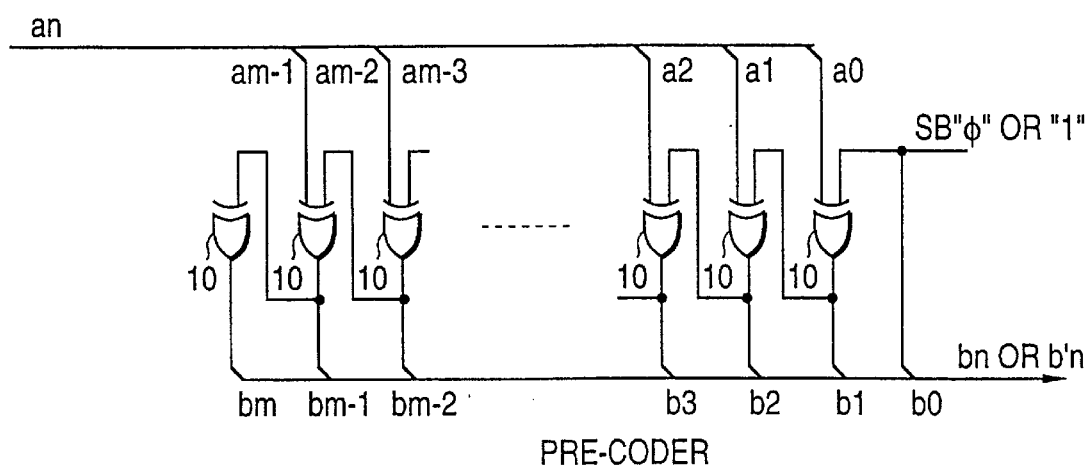
FIG. 4 is a block diagram of a pre-coder.

In the pre-coders 3a and 3b, the input bit rows are pre-coded. The pre-coders 3a and 3b produce the input SB as $b_o$ as shown in FIG. 4, and operate a0 by exclusive OR with SB in an EXOR 10, and produce b1. This output, that is, b1 is operated by exclusive OR with a1 in the EXOR 10, and b2 is output. Thus, $a_p$ is produced as $b_{p+1}$ by exclusive OR with $b_p$ (p=0, 1, . . . , m−1). At this time, the pre-coder 3a receives the SB as 0, and produces bit row $b_n$. The pre-coder 3b receives the SB as 1, and produces bit row $b_{n'}$.

Figure 5:
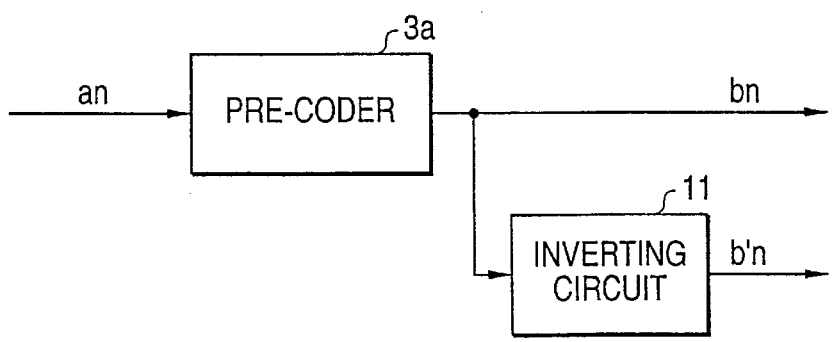
FIG. 5 is a block diagram of another pre-coding portion.

Herein, between the output bit row of the pre-coder 3a when the SB is 0, and the output bit row of the pre-coder 3b when the SB is 1, as mentioned above, there is a relationship in which all bits are mutually inverted, and hence, without using two pre-coders as in FIG. 1, by inverting the output $b_n$ of the pre-coder 3a by an inverting circuit 11 as shown in FIG. 5, the same as the output $b_n$ of the pre-coder 3b is obtained. Likewise, by generating the bit row $b_{n'}$ by using the pre-coder 3b, the bit row $b_n$ may be generated by inverting it. Or, by using one pre-coder in time sharing, $b_n$ and $b_{n'}$ can be generated. Moreover, since $b_0$ is delivered to the judging circuit but $b_0$ is always 0 and $b_n$ is always 1, they may be generated in the judging circuit 4 without producing outputs.

Figure 6:
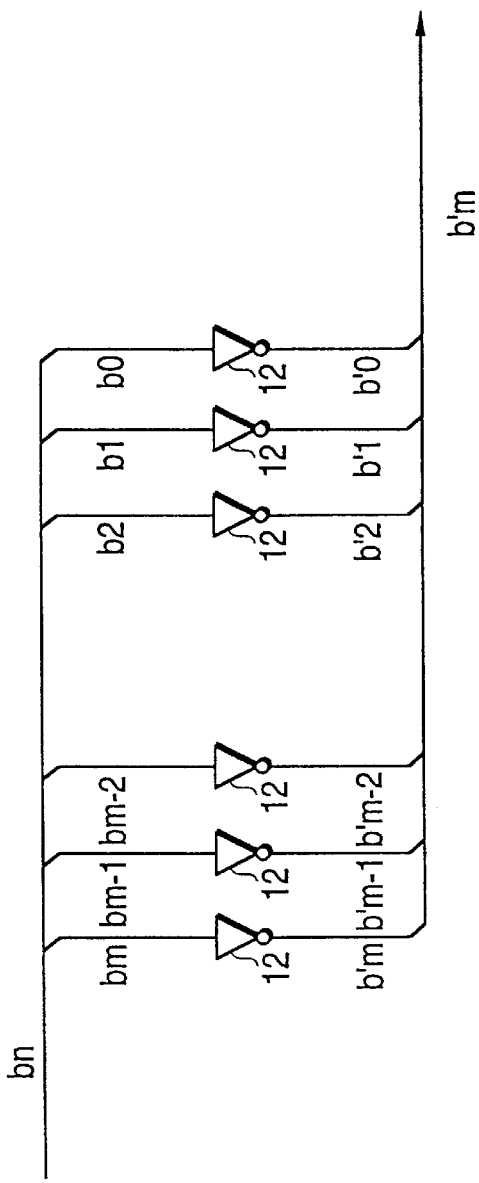
FIG. 6 is a block diagram of an inverting circuit.

A block diagram of an inverting circuit 11 is shown in FIG. 6. An inverting element 12 produces 1 when the input bit is 0, and produces 0 when the input bit is 1. By feeding the bits of the bit row $b_n$ into the inverting element 12, all bits are output in inverted form. The output bit row is a same bit row as $b_{n'}$. Thus, $b_n$ and $b_{n'}$ are generated.

Figure 7:
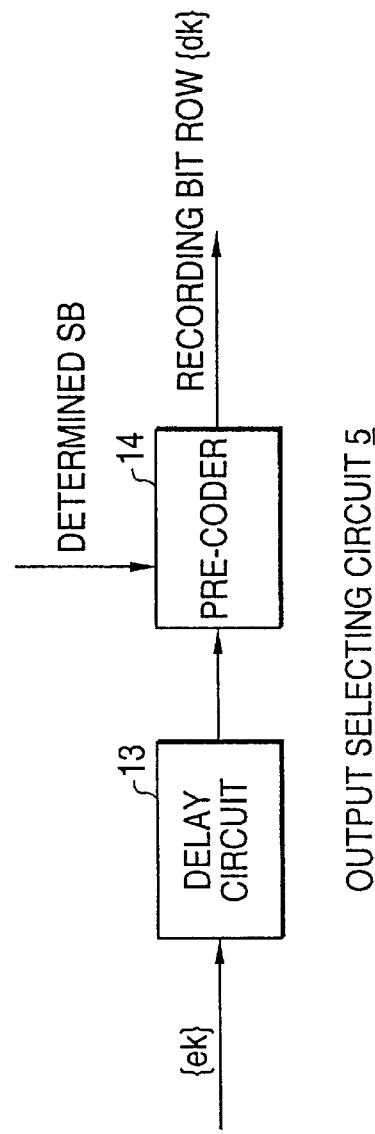
FIG. 7 is a block diagram of an output selecting circuit 5.
Figure 8:
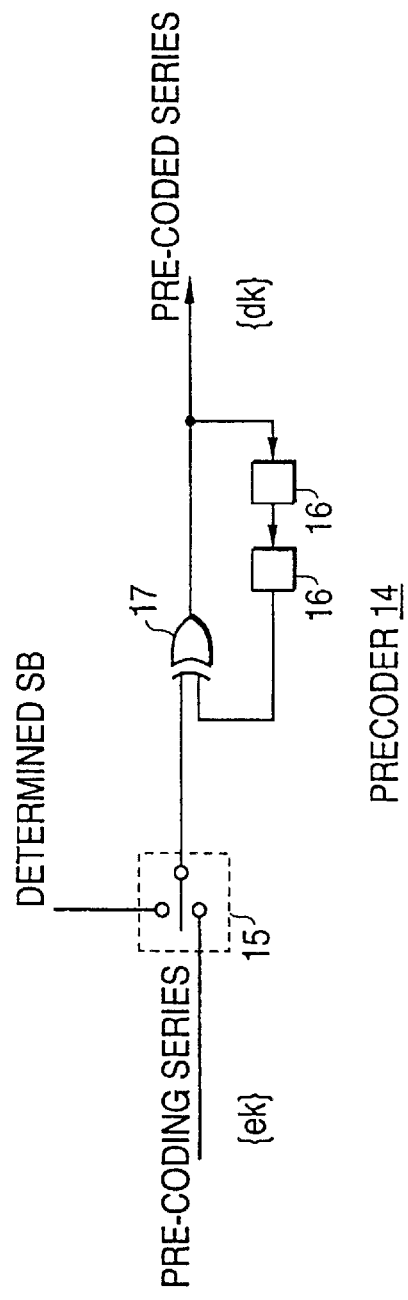
FIG. 8 is a block diagram of a pre-coder 14.

The $b_n$ and $b_{n'}$ are fed into the judging circuit 4, and the bit row closer to the specified frequency characteristic is determined, and the determined SB is output. The judged SB is fed into the output selecting circuit 5. In the output selecting circuit 5, the bit series $\{e_k\}$ is entered. A block diagram of the output selecting circuit 5 is shown in FIG. 7. The bit series $\{e_k\}$ is fed into a delay circuit 13, and it is delayed until the SB is judged in the judging circuit 4. The output of the delay circuit 13 is fed into a pre-coder 14, and the determined SB is inserted in every m bits, and the pre-coded output is produced. The pre-coder 14 is composed, for example, as shown in FIG. 8, and the determined SB of the judging circuit 5 is inserted by a switch 15 in every m bits of the input bit series $\{e_k\}$. The bits delayed by the delay circuit 16 from the output series of the pre-coder 14, and the output bits of the switch 15 are operated by exclusive OR in an EXOR 17, and the result is produced as the output of the pre-coder 14. Herein, the delay circuit 16 and EXOR 17 are the circuits for realizing formula (1). The delay circuit 16 delays by one clock. The record bit series $\{d_k\}$ which is the output of the output selecting circuit 5 is converted into a recording current by the recording amplifier 6, and recorded on the magnetic tape 8 by the recording head 7.

Incidentally, the record bit series $\{d_k\}$ may be also produced as the record bit series $\{d_k\}$ by restructuring the pre-coded outputs $b_n$ and $b_{n'}$ of the pre-coders 3a and 3b according to the determined SB, without pre-coding the $\{e_k\}$ newly.

Figure 9:
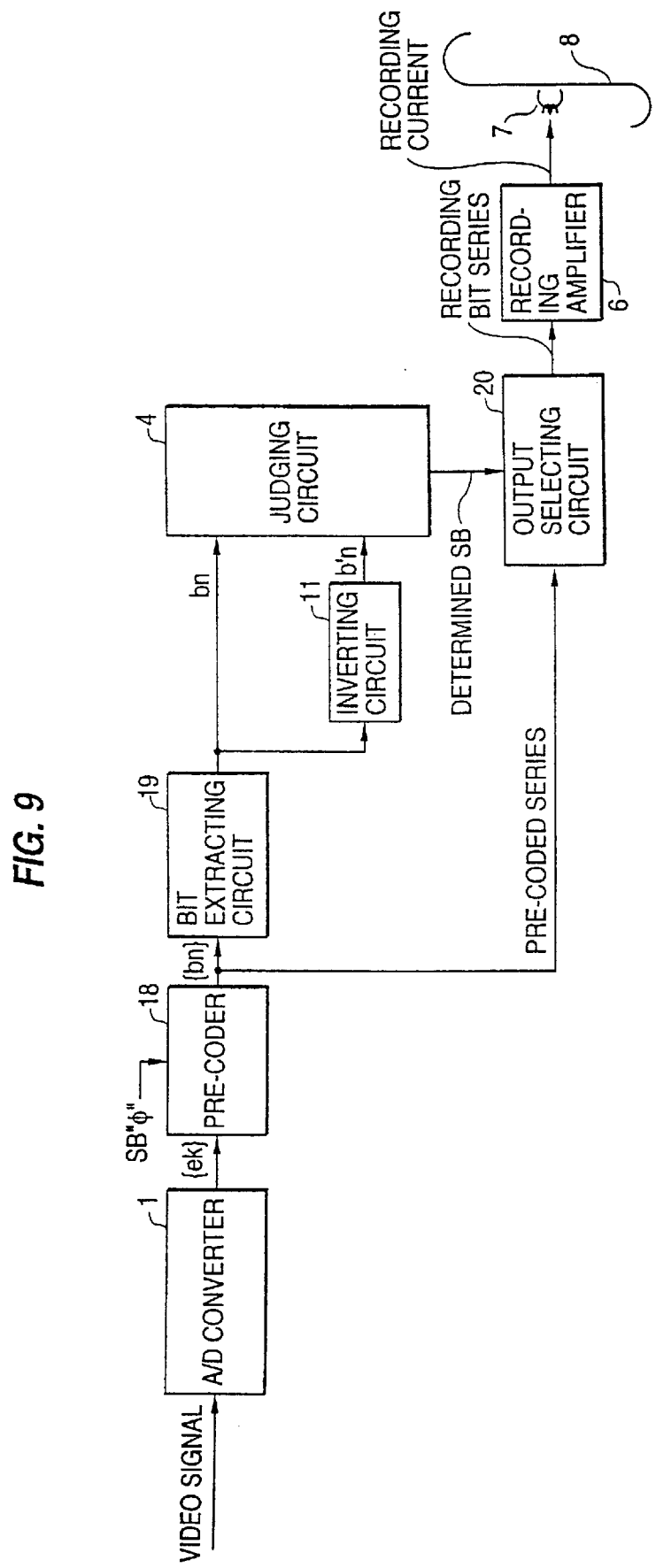
FIG. 9 is a block diagram of another embodiment of the present invention.

In the foregoing description, the SB is judged by extracting the bits, that is, $a_n$ of input data series changed in the polarity by varying the polarity of SB, in the bit-extracting circuit 2. By contrast, the SB may be preliminarily inserted as 0, and pre-coded, and bits changing in the polarity in the pre-coded series can be extracted. A block diagram at this time is shown in FIG. 9. The input data series is fed into a pre-coder 18, the SB is inserted as 0, and the interleaved NRZI modulation technique is performed. The output of the pre-coder 18 is fed into a bit extracting circuit 19, and bits changing in polarity by the change of SB polarity are extracted. The extracted bits are the same bit rows as the output, or $b_n$ the pre-coder 3a when the SB is 0. The output of the bit extracting circuit 19 is fed to the inverting circuit 11, and the pre-coded output $b_{n'}$ when the SB is 1 is produced. Both $b_n$ and $b_{n'}$ are fed into the judging circuit 4, and the bit row closer to the desired frequency characteristic is judged, and the determined SB is produced. The determined SB is fed into an output selecting circuit 20. In the output selecting circuit 20, from the determined SB and output series of the pre-coder 18, the recording bit series is delivered. The recording bit series is converted into a recording current by the recording amplifier 6, and recorded on the magnetic tape 8 by the recording head 7.

Figure 10:
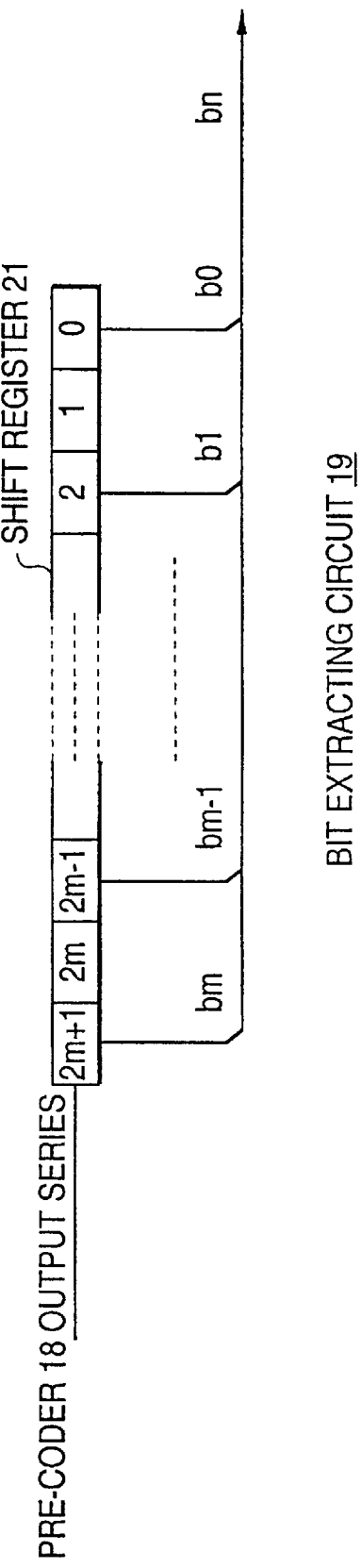
FIG. 10 is a block diagram of a bit extracting circuit 19.
Figure 11:
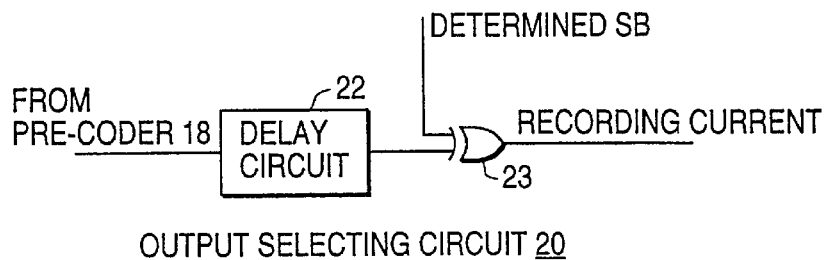
FIG. 11 is a block diagram of an output selecting circuit 20.

The pre-coder 18 is the same circuit as the pre-coder 14. However, always "0" is inserted as the SB. An example of the bit extracting circuit 19 is shown in FIG. 10. The bits to be inverted as the SB is inverted in the pre-coder output series $b_n$ are, as shown in FIG. 2, m+1 bits including the SB of the odd number counting from the SB. The input pre-coder output series is fed into a shift register 21 of 2m+1 stages, and when the SB comes to the beginning of the shift register 21, m+1 bits are delivered in every 2 bits. This is the bit row pre-coded when the SB is 0, that is $b_n$, and it is fed in the judging circuit 4, and is also fed into the inverting circuit 11, thereby generating $b_{n'}$. The output $b_{n'}$ of the inverting circuit 11 is also input to the judging circuit 4. An example of output selecting circuit 20 is shown in FIG. 11. The output series of the pre-coder 18 in FIG. 9 is fed into the delay circuit 22, and is delayed until the SB is judged in the judging circuit 4. The SB determined to be the output series of the delay circuit 22 is fed to an EXOR 23. That is, what is fed into the output selecting circuit 18 is the pre-coder output series when the SB is "0", and nothing is delivered when the determined SB corresponding to the output bit is "0", and when the determined SB is "1", it is inverted and output.

Instead of the record bit series $\{d_k\}$, the determined SB may be inserted into the input data series $\{e_k\}$, and pre-coded, and the record bit series $\{d_k\}$ may be obtained.

Figure 12:
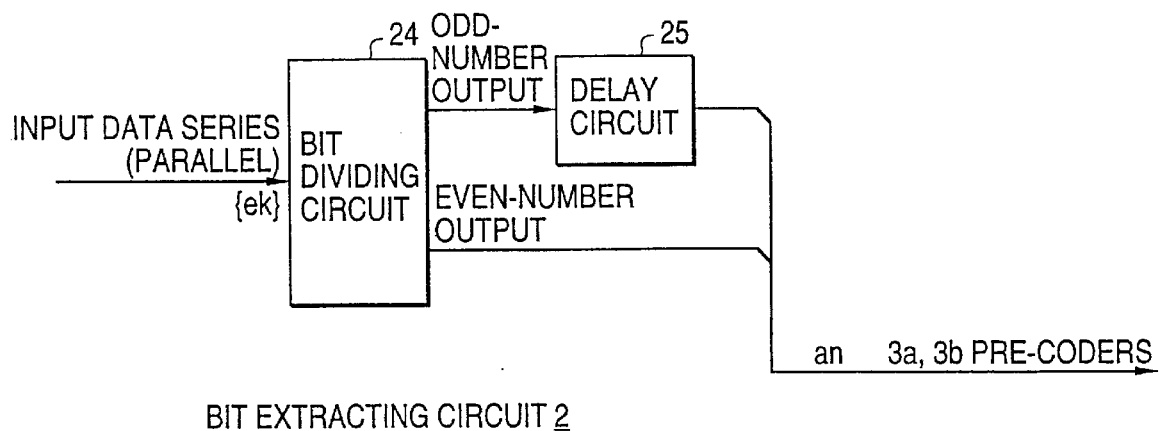
FIG. 12 is a block diagram of another bit extracting circuit.

The bit extracting circuit 2 may be composed without using the shift register. A block diagram of such a bit extracting circuit 2 is shown in FIG. 12.

Figure 13:
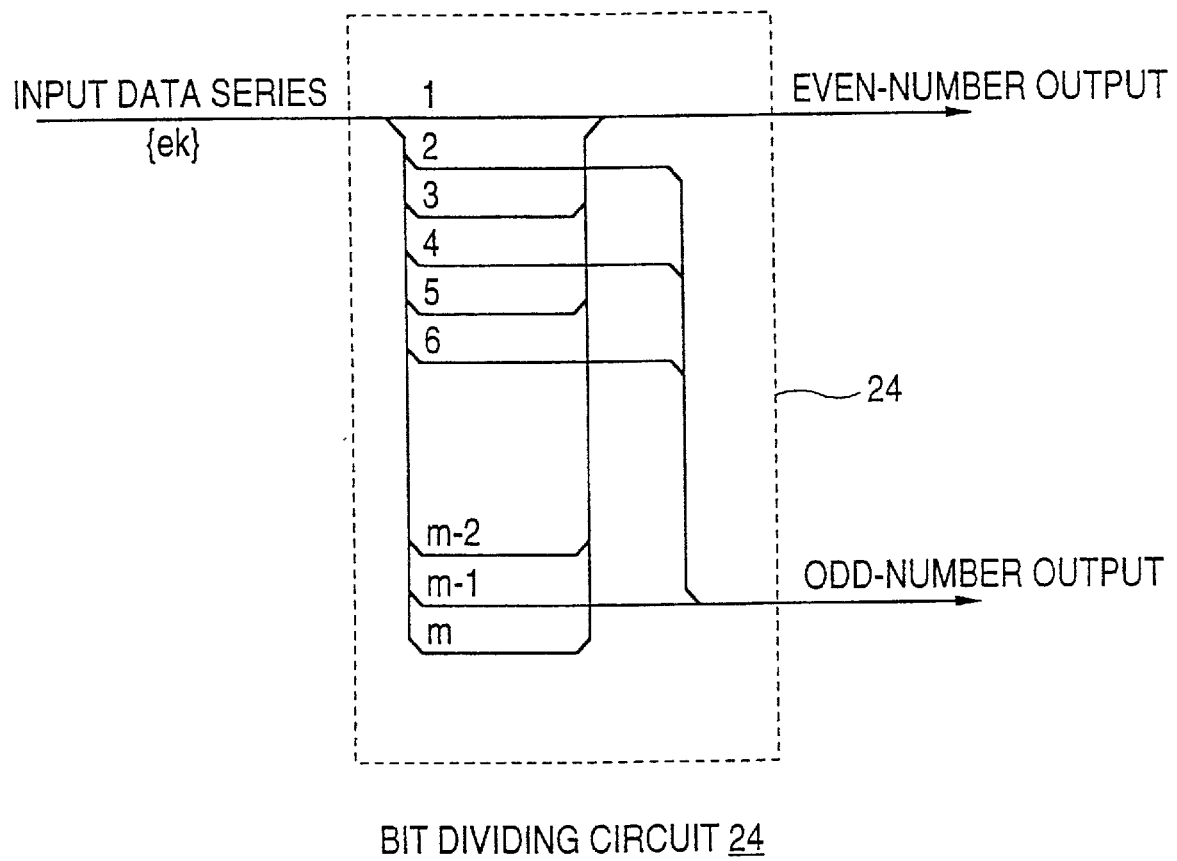
FIG. 13 is a block diagram of a bit dividing circuit 24.

The data series $\{e_k\}$ entered in m-bit parallel data is fed into a bit dividing circuit 24, and is divided into odd-number bits and even-number bits from the beginning. An example of the bit dividing circuit 24 is shown in FIG. 13. The odd-number bits divided by the bit dividing circuit 24 are fed into the delay circuit 21. The output bit row of a delay circuit 25 and the even-number bit output of the bit dividing circuit 24 are nothing but $a_n$. In such a constitution, the circuit scale may be further reduced for the data series of parallel input.

In such a constitution, by extracting the bit row changing in the polarity by varying the SB polarity, and determining the SB by the comparison of the frequency components of the bit rows, bit series of larger notches or larger pilot signals may be generated and recorded. In this method, the number of bits of the bit row used in the judgement of SB is unchanged, that is, m+l bits, and the recording apparatus may be composed in a similar circuit scale.

To judge the SB, hitherto, the frequency component was extracted by using a Fourier transform. For a Fourier transform, however, it was necessary to multiply the input series by the sine and cosine waveforms as the reference. As known well, the multiplier is large in circuit scale, which caused an increase in the cost of the circuit for extracting the frequency component. In addition, to determine the frequency component, the mean square of the determined sine component and cosine component must be calculated. It is also large in the circuit scale, leading to an increase of the cost of the circuit for extracting the frequency component.

Figure 14:
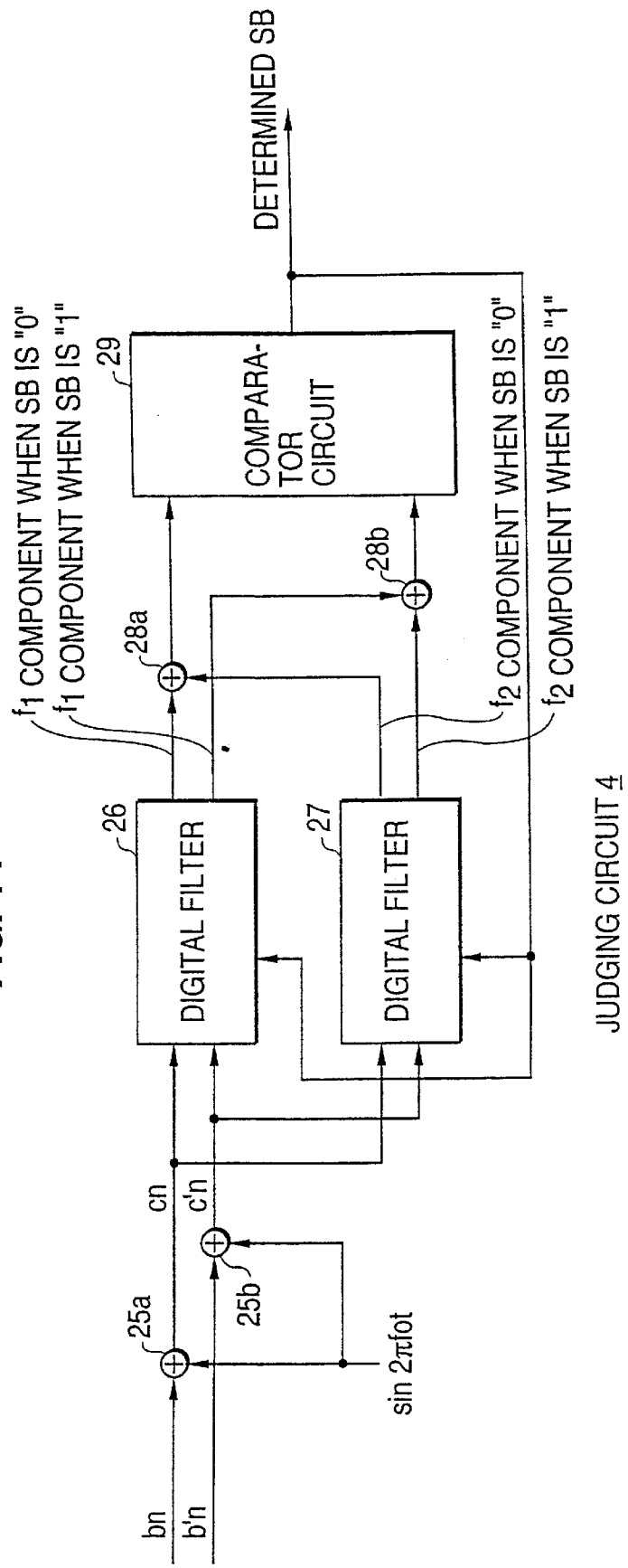
FIG. 14 is a block diagram of a judging circuit 4.

To solve these problems, it has been found to be possible to extract the frequency components by using a digital filter. FIG. 14 shows a block diagram of the judging circuit 4 using digital filters for extracting the frequency components for judging the SB. In digital filters 26 and 27, the frequency components of the input bit series are extracted by using the digital filters of the IIR (Infinite Impulse Response) type. Herein, notches are provided at two frequencies $f_1$ and $f_2$, and the $f_1$ frequency components of $b_n$ and $b_{n'}$ are determined in the digital filter 26, and the $f_2$ frequency components of $b_n$ and $b_{n'}$ are determined in the digital filter 27. The $f_1$ frequency component and $f_2$ frequency component of $b_n$ determined in the digital filters 26 and 27 are added in an adder 28a, and fed into a comparator circuit 29. Similarly, the $f_1$ frequency component and $f_2$ frequency component of $b_{n'}$ are added in an adder 28b, and fed into the comparator circuit 29. In the comparator circuit, the frequency components of $b_n$ and $b_{n'}$ are compared, and the smaller SB is delivered as the determined SB. The determined SB is fed into the digital filters 26 and 27 in order to match with the internal data of the digital filters. When adding the pilot component to the frequency of $f_0$, before input of $b_n$ and $b_{n'}$ to the digital filters 26 and 27, $\sin 2\pi f_0 t$ is added by the adder 25a and adder 25b, the series of the frequency characteristic possessing a pilot component and also having a notch can be selected. In the adder 25a, $b_n$ and $\sin 2\pi f_0 t$ are added, and in the adder 25b, $b_{n'}$ and $\sin 2\pi f_0 t$ are added. Herein is shown a block of judging circuits for selecting the series in which notches are provided in the frequencies of $f_1$ and $f_2$ and there is a pilot signal in the frequency of $f_0$, but the selection of a bit series having notches in more frequencies is possible with the parallel connection of a digital filter for extracting the frequency component with the digital filters 26 and 27. The pilot frequency is $f_0$, but it may be the same frequency as $f_1$ or $f_2$.

Figure 15:
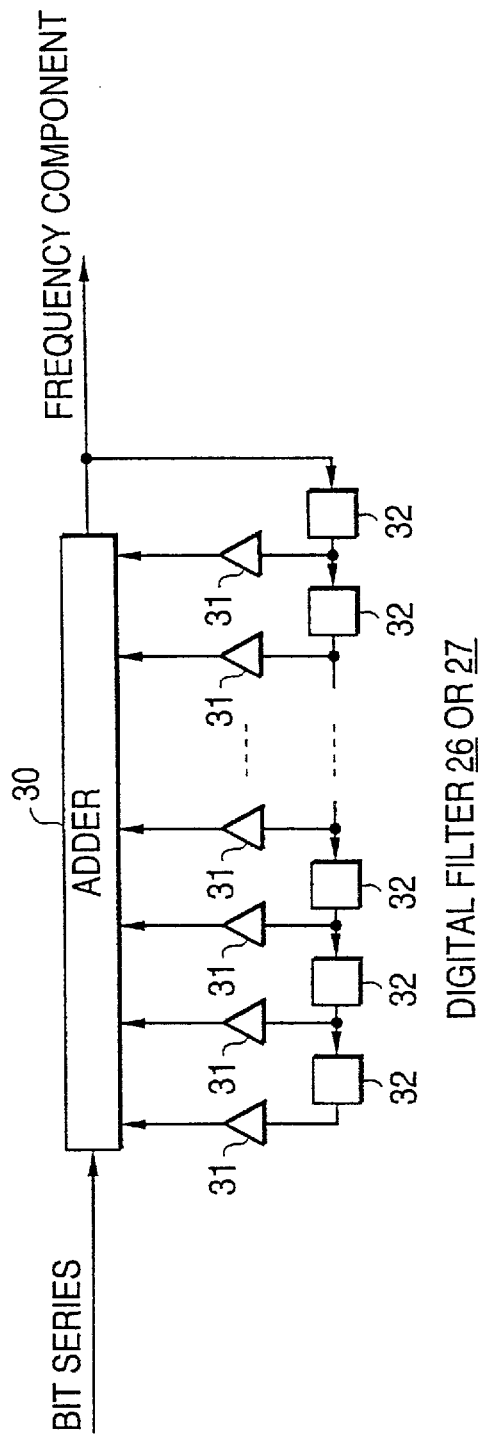
FIG. 15 is a block diagram of an IIR type digital filter 26 or 27.

A block diagram of general IIR type digital filters is shown in FIG. 15. The outputs of digital filters are delayed in a delay circuit 32, a coefficient is multiplied in a multiplier 31, and input data series is added, and the sum is output. By varying the number of stages of the delay circuit 32 and the coefficient of the multiplier 31, it is known that a filter possessing an arbitrary frequency characteristic can be obtained. The digital filter 26 and digital filter 27 extract the frequency components of $f_1$ and $f_2$ according to the principle of the IIR type digital filter. In this constitution, a delay circuit 32 is an element for delaying the bit clock of 1 bit.

Figure 16:
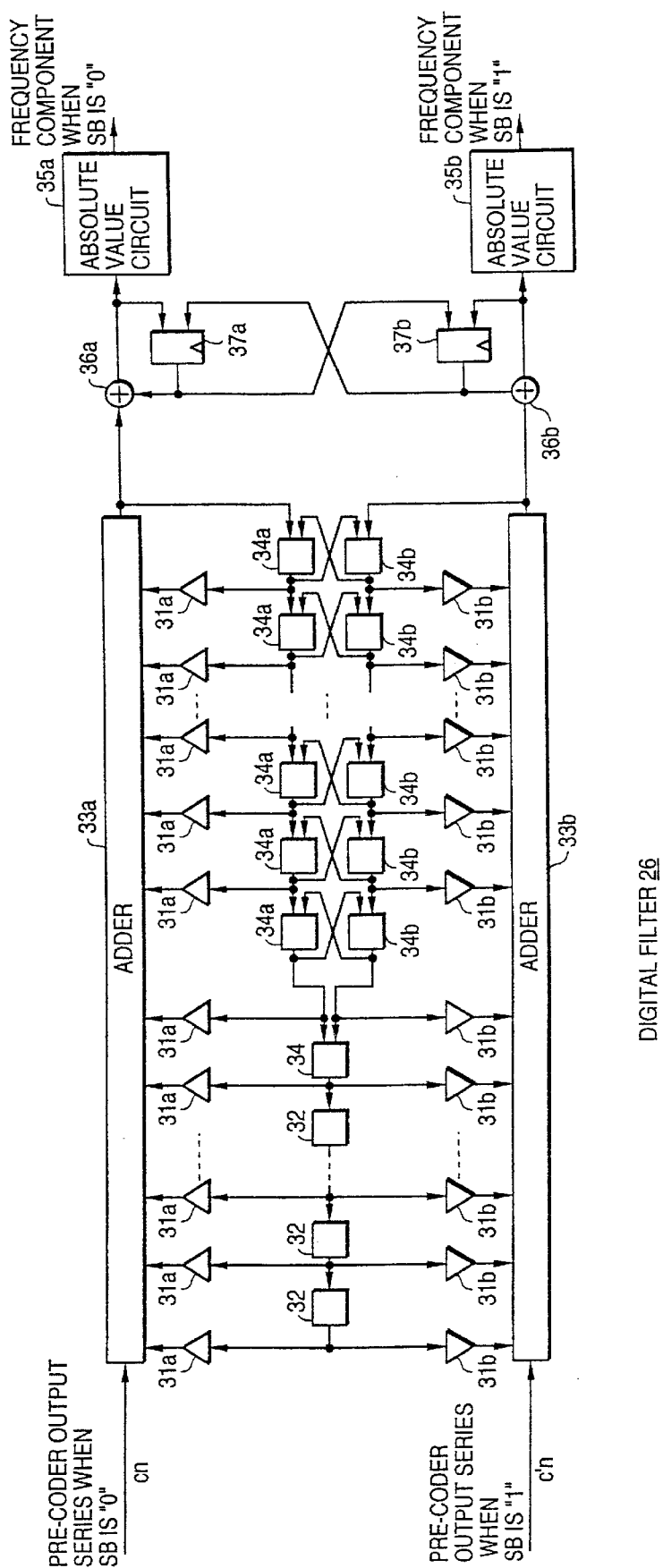
FIG. 16 is a block diagram of digital filter 26.

A block diagram of the digital filter 26 is shown in FIG. 16. An adder 33a, delay circuits 32, 34 and 34a, and multiplier 31a compose an IIR type digital filter having the peak at the frequency of $f_1$ to $b_n$. The output of the adder 33a is combined with the sum of the frequency components hitherto recorded in a register 37a by the adder 36a, and an absolute value is obtained in the absolute value circuit 35a, and the $f_1$ frequency component of $b_n$ is delivered. Similarly, an adder 33b, delay circuits 32, 34, and 34b, and multiplier 31b compose an IIR type digital filter having the peak at the frequency of $f_1$ to $b_{n'}$, and produce an output. The output of the adder 33b is combined with the sum of the frequency components hitherto recorded in a register 37b by the adder 36b, and an absolute value is obtained in the absolute value circuit 35b, and the frequency component of $f_1$ of $b_{n'}$ is produced.

In this way, the frequency components of $b_n$ and $b_{n'}$ are calculated and produced. The delay component of the digital filter when the SB is 0 is delayed in the delay circuit 34a, and when the SB is 1 in the delay circuit 34b. Accordingly, when the SB is determined by the frequency components of outputs $b_n$ and $b_{n'}$, if the determined SB is 0, the content of the delay element 34a is copied in the delay circuit 34b. If the determined SB is 1, to the contrary, the content of the delay element 34b is copied in the delay circuit 34a. Similarly, the contents of the registers 37a and 37b are copied according to the determined SB. Thus, regardless of the determined SB, the matching of digital filters is achieved.

In FIG. 16, the digital filter 26 is explained, whereas the digital filter 27 is composed by constructing the IIR type digital filter having the peak at $f_2$ by varying the number of stages of the delay circuit 32 in FIG. 15 and coefficients of the multipliers 31a and 31b.

Figure 17:
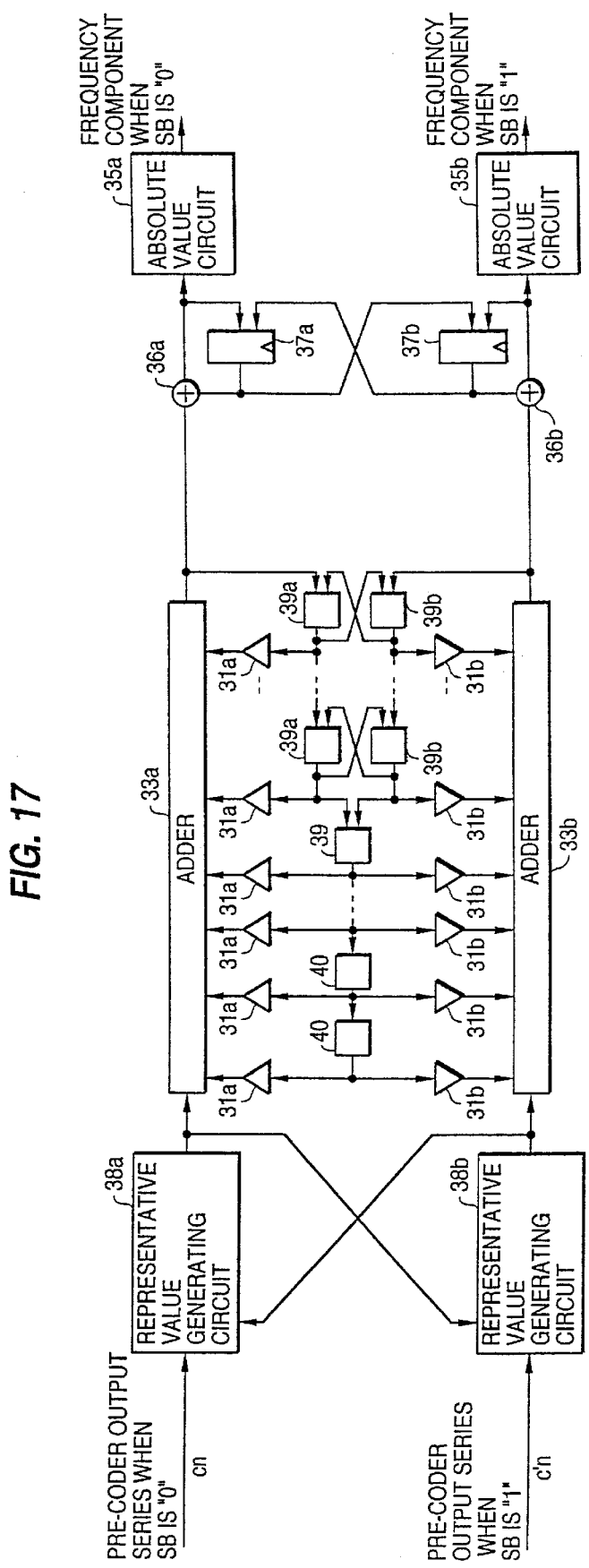
FIG. 17 is a block diagram of other constitution of the digital filter 26.

In this way, the frequency components can be operated upon by using the digital filters. This method is not practical because lots of calculations are necessary in each bit. Hence, without having to calculate the frequency components in every bit, by determining a representative value in every specific bits, and determining the frequency component of the representative value, the frequency components of bit row can be determined. A block diagram of the digital filter 26 in this case is shown in FIG. 17. The input $b_n$ is input to a representative value generating circuit 38a, and the input $b_{n'}$ is input to a representative value generating circuit 38b, and the representative value of every k bits (k is a natural number) is generated and produced. The adder 33a, delay circuits 40, 39, and 39a, and multiplier 31a compose an IIR digital filter having a peak at $f_1$, and a frequency component of $f_1$ of the representative value of the input $b_n$ is produced. Similarly, the adder 33b, delay circuit 40, 39 and 39b, and multiplier 31b composed an IIR type digital filter having a peak at $f_1$, and a frequency component of $f_1$ of the representative value of the input $b_{n'}$ is produced. The output of the adder 33a is combined with the value of the register 37a, the absolute value is obtained by the absolute value circuit 35a, and produced as the frequency component of $f_1$ of $b_n$. Similarly, the output of the adder 33b is combined with the value of the register 37b, and the absolute value is obtained by the absolute value circuit 35b, and is produced as the frequency component of $f_1$ of $b_{n'}$. As in the digital filter 26 shown in FIG. 16, when the SB is determined, the value determined by the delay circuits 39a and 39b, or registers 37a and 37b is copied in the other delay circuit or register.

Figure 18:
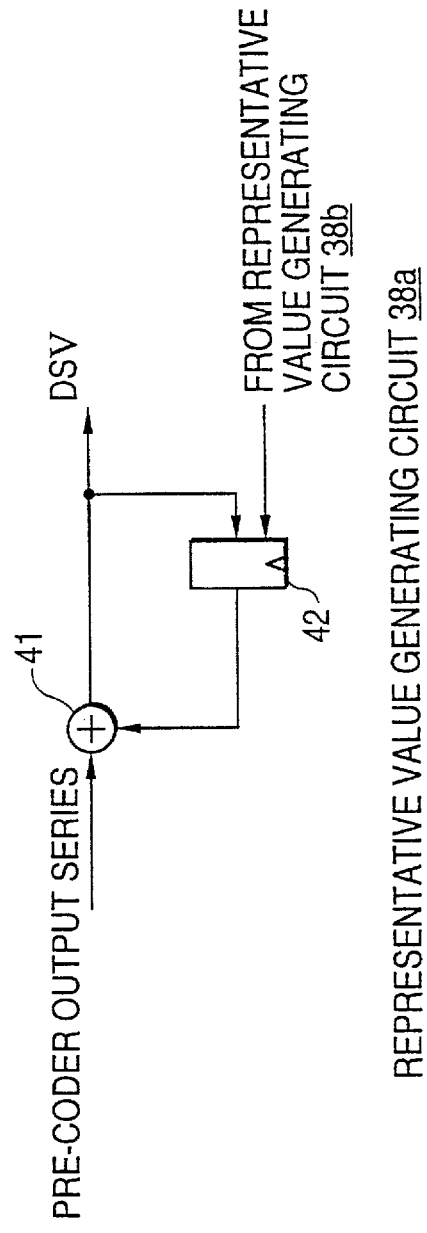

As an example of representative value produced by the representative value generating circuit, DSV (digital sum variation) may be employed. A block diagram of the representative value generating circuit for generating DSV as a representative value is shown in FIG. 18. The DSV is obtained by integrating "0" of bit row as −1, and "1" as +1. The DSV is stored in the register 42. In the adder 41, converted into the input bit +1 or −1, it is combined with the DSV stored in the register 41, and the sum is stored a register 42. After addition of k-th bit, the DSV of the calculation result is combined with the stored DSV, and produced as output. The DSV generated here is the DSV corresponding to the input series. After the SB is determined, the value of the register 42 of the determined representative value calculating circuit is copied in the register 42 of the representative value calculating circuit.

In this circuit composition, as compared with the circuit composition in FIG. 16, the delay circuit and multiplier are required only by 1/k for extracting frequency components of the same frequency, and the circuit scale is reduced, and the operating speed can be slowed down, so that the energy may be saved.

Figure 19:
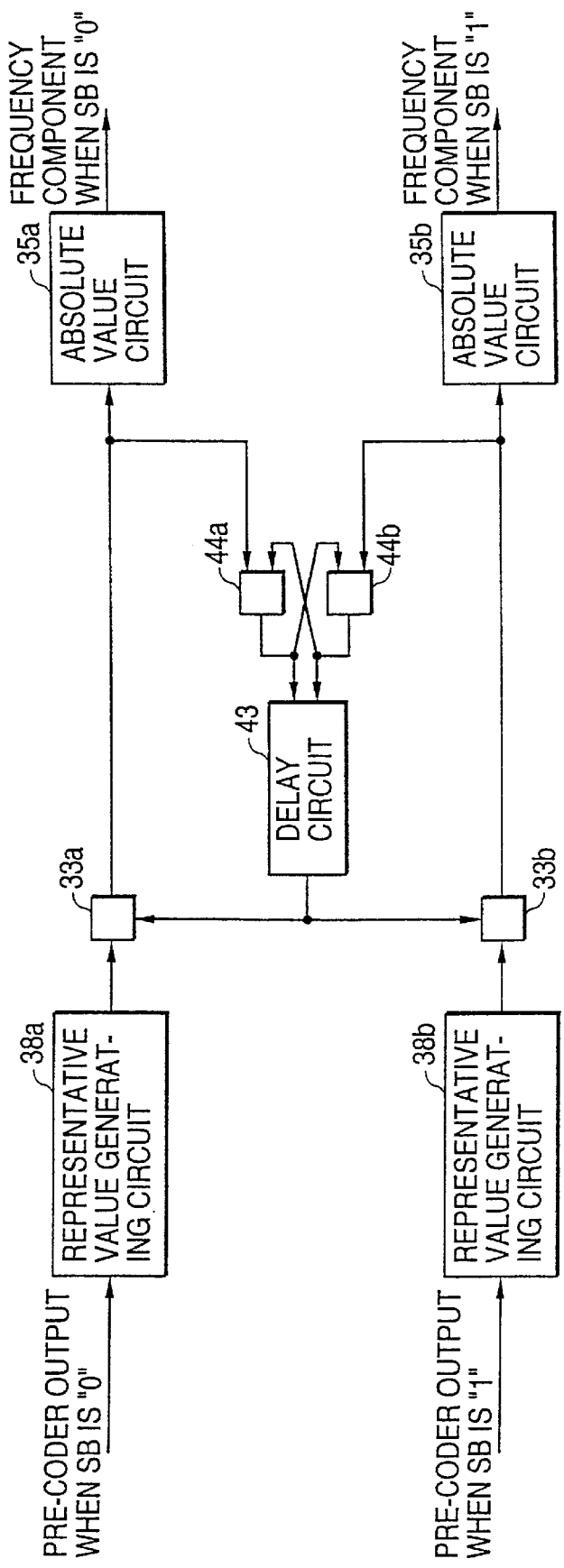
FIG. 19 is a block diagram of a different constitution of the digital filter 26.

In the circuit composition in FIG. 17, if the coefficients of the multipliers 31a and 31b of the final stage are 1, and the coefficients of the other multipliers 31a and 31b are 0, then a block diagram of digital filter 26 is shown in FIG. 19.

Of the input bit row $b_n$, the representative value is generated and produced by the representative value generating circuit 38a. The representative value is fed into a digital filter composed of adder 33a, and delay circuits 43 and 44a. The output of the adder 33a is fed into the absolute value circuit 25a, and is produced as the $f_1$ frequency component of $b_n$. Similarly, of the input bit row $b_{n'}$, the representative value is generated and produced in the representative value generating circuit 38b. The representative value is fed into a digital filter composed of adder 33b and delay circuits 43 and 44b. The output of the adder 33b is fed into the absolute value circuit 25b, and produced as frequency components of $f_1$ of $b_{n'}$.

Figure 20:
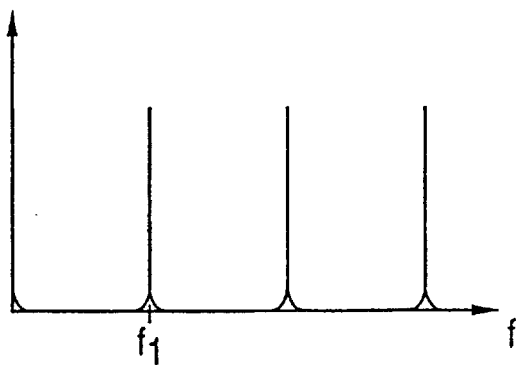
FIG. 20 is a frequency characteristic diagram of a digital filter.

The frequency characteristic of the digital filter in FIG. 19 is shown in FIG. 20. The delay time of the delay circuit 43 is set so that the frequency to be extracted, or $f_1$, may be the lowest frequency of peak. When generating notches at plural frequencies, by varying the delay time of the delay circuit 43, it is possible to vary the frequency for generating notches. Such digital filters are arranged parallel as many as the number of notches, and the sums of the frequency components are compared, and the SB is determined.

Figure 21:
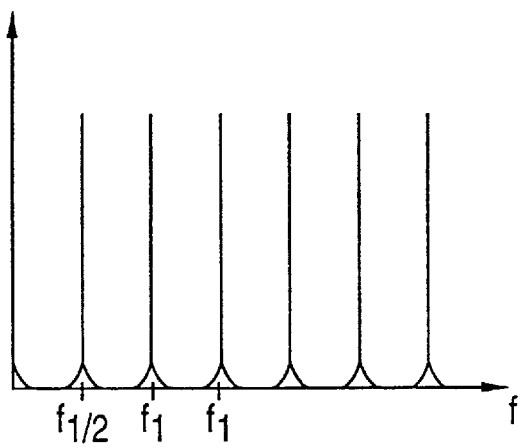
FIG. 21 is a frequency characteristic diagram of the digital filter.
Figure 23:
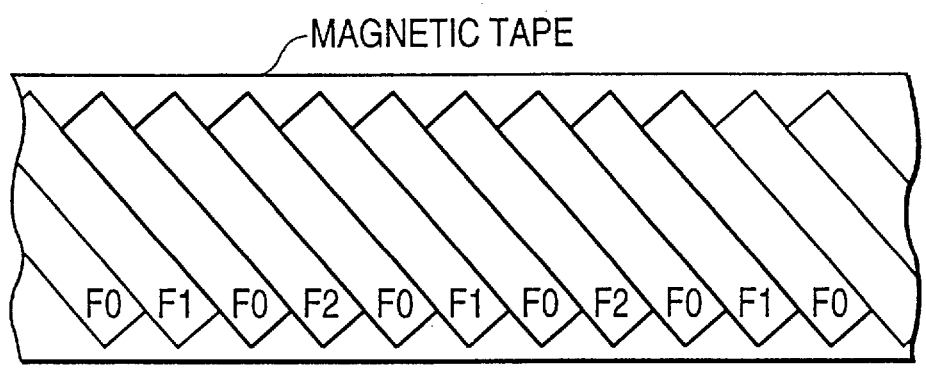
FIG. 23 is a track pattern diagram.
Figure 22:
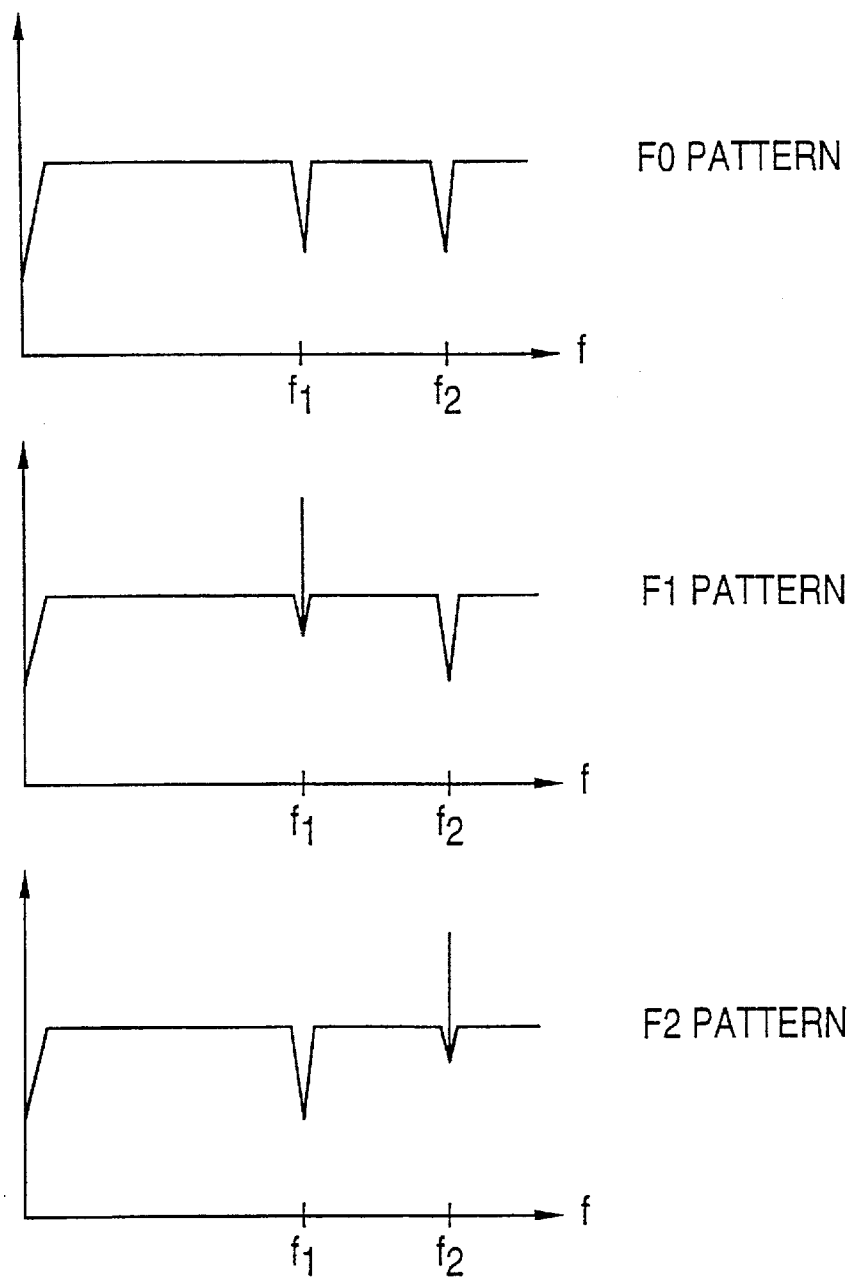
FIG. 22 is a frequency characteristic diagram of the recording signal.

Reviewing the frequency characteristics in FIG. 20, not only $f_1$ which is the desired frequency, but also the DC component at which the frequency is 0, and component of frequency of a common multiple of $f_1$ are produced by the digital filter in FIG. 19. Accordingly, when generating notches in two frequencies $f_1$ and $f_2$, by using the digital filter in FIG. 19 at the frequency of the greatest common measure of $f_1$ and $f_2$, the notches at frequencies $f_1$ and $f_2$ can be composed of one digital filter. Supposing the ratio of frequencies $f_1$ and $f_2$ to be 2:3, the frequency characteristic may be as shown in FIG. 21 by setting the fundamental frequency of digital filter to be $f_1/2$, and it is possible to set notches at two frequencies by using only one digital filter, which contributes to a reduction of circuit scale.

What is claimed is:

1. A recording apparatus comprising: a bit extracting means for extracting inverted m+1 bits of a first series of bits obtained by an interleaved NRZI modulation of an input data series added to one "0" bit per every m bits (m is an even number which is equal to or greater than 2) and a second series of bits obtained by an interleaved NRZI modulation of the input data series added to one "1" bit per every m bits; a frequency component extracting means for extracting at least two specific frequency components from outputs of the bit extracting means; an output selection means for producing an output bit series depending on a value of the frequency component; and a recording means for recording the output bit series on a recording medium, wherein the frequency component extracting means comprises: a digital filter for extracting at least two specific frequency components from the first series of bits and the second series of bits.

2. A recording apparatus of claim 1, wherein the digital filter is a digital filter for extracting the frequency components at the frequency of a common measure of extracting frequency.

3. A recording apparatus comprising: a bit extracting means for extracting inverted m+1 bits of a first series of bits obtained by an interleaved NRZI modulation of an input data series added to one "0" bit per every m bits (m is an even number which is equal to or greater than 2) and a second series of bits obtained by an interleaved NRZI modulation of the input data series added to one "1" bit per every m bits; a frequency component extracting means for extracting at least two specific frequency components from outputs of the bit extracting means; an output selection means for producing an output bit series depending on a value of the frequency component; and a recording means for recording the output bit series on a recording medium, wherein the frequency component extracting means comprises:

a representative value generating means for generating a representative value of every K bits of series from the first and second series of bits; and a digital filter for extracting at least two specific frequency components in the series of the representative values.

4. A recording apparatus of claim 3, wherein the digital filter is a digital filter for extracting the frequency components at the frequency of a common measure of extracting frequency.

* * * * *